Figure 1:
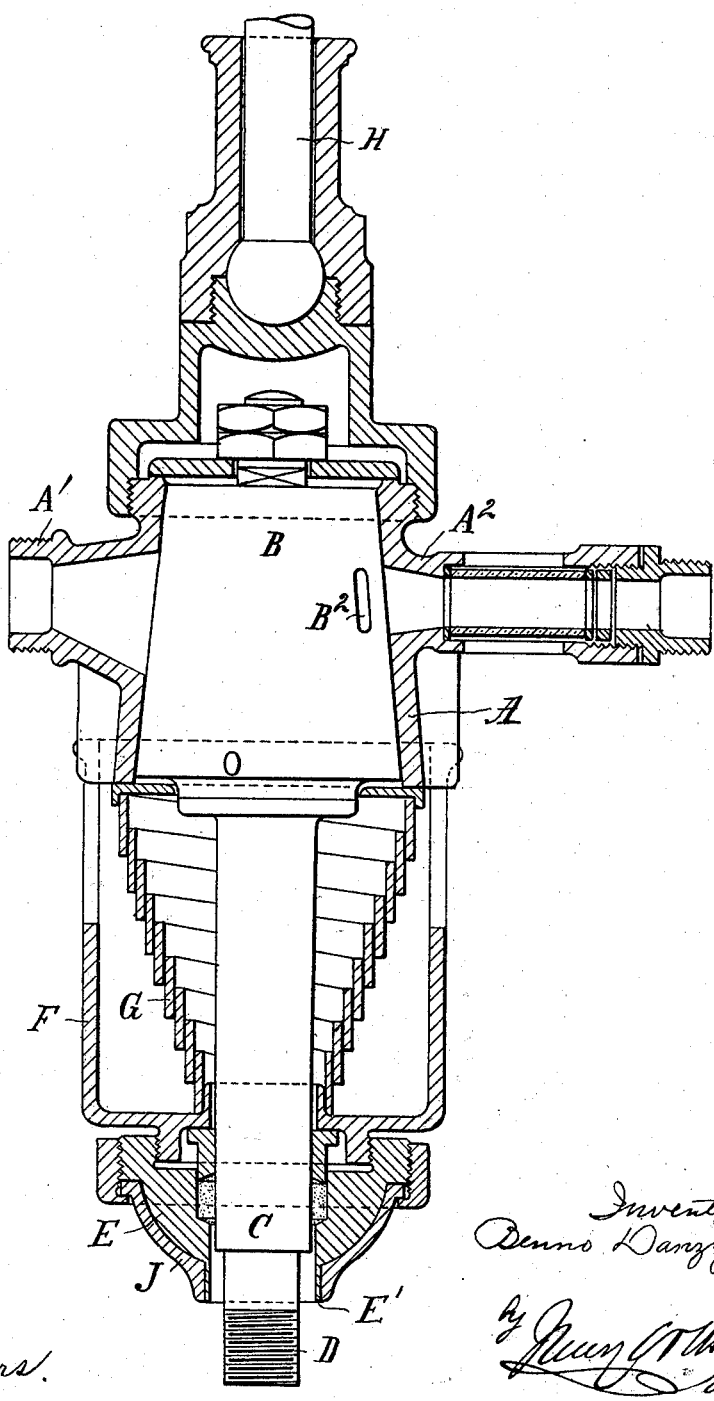

No. 609,986. Patented Aug. 30, 1898.
B. DANZIGER.
APPARATUS FOR DRAWING OFF LIQUIDS CONTAINING AIR OR OTHER GASES.
(Application filed Dec. 31, 1897.)
(No Model.) 5 Sheets—Sheet 1.

No. 609,986. Patented Aug. 30, 1898.
B. DANZIGER.
APPARATUS FOR DRAWING OFF LIQUIDS CONTAINING AIR OR OTHER GASES.
(Application filed Dec. 31, 1897.)
(No Model.) 5 Sheets—Sheet 3.

Witnesses
Inventor
Benno Danziger,

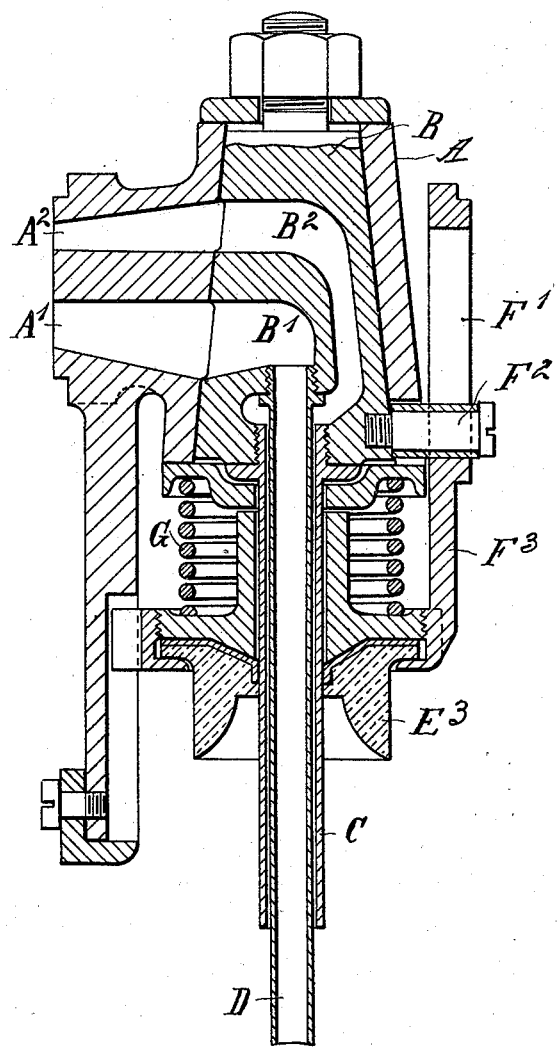

No. 609,986. Patented Aug. 30, 1898.
B. DANZIGER.
APPARATUS FOR DRAWING OFF LIQUIDS CONTAINING AIR OR OTHER GASES.
(Application filed Dec. 31, 1897.)
(No Model.) 5 Sheets—Sheet 5.
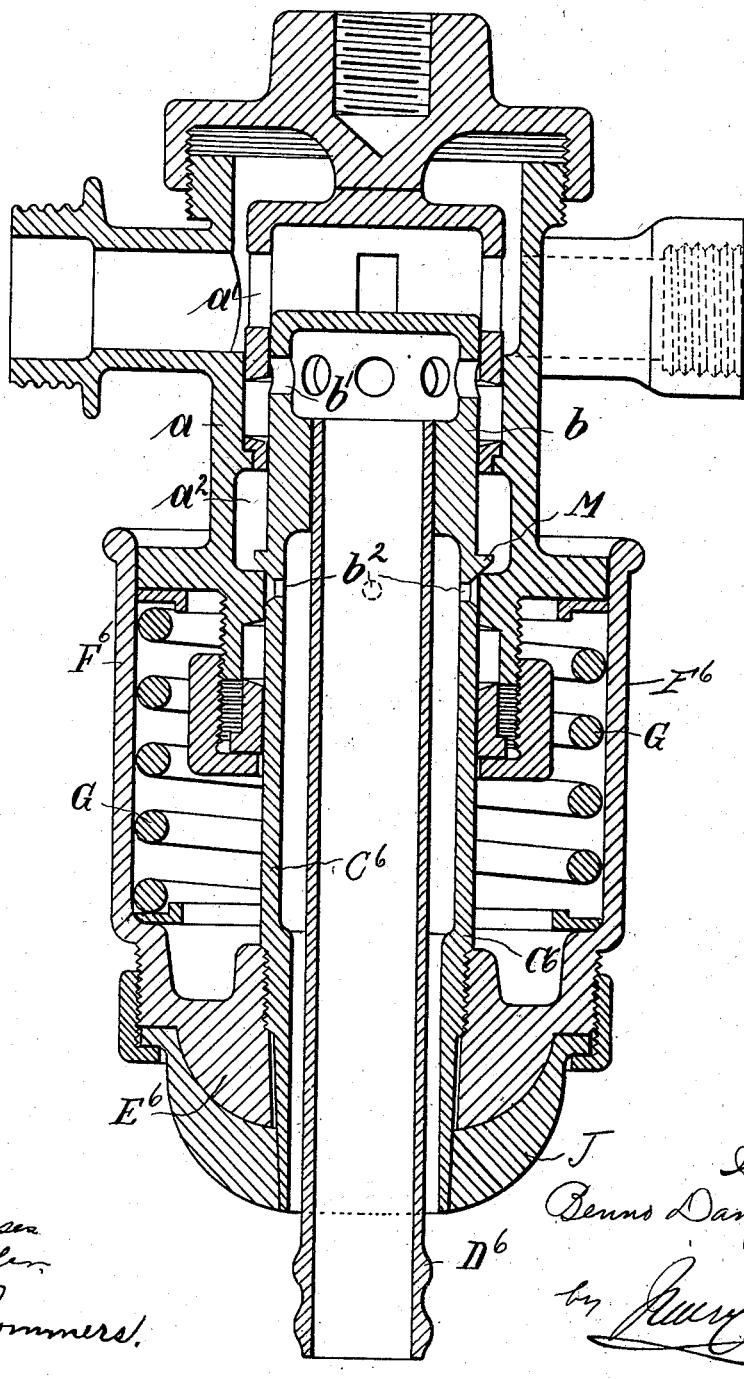

UNITED STATES PATENT OFFICE.

BENNO DANZIGER, OF MANNHEIM, GERMANY.

APPARATUS FOR DRAWING OFF LIQUIDS CONTAINING AIR OR OTHER GASES.

SPECIFICATION forming part of Letters Patent No. 609,986, dated August 30, 1898.

Application filed December 31, 1897. Serial No. 664,915. (No model.) Patented in Germany April 1, 1897, No. 95,373.

*To all whom it may concern:*

Be it known that I, BENNO DANZIGER, of Mannheim, in the German Empire, have invented certain new and useful Improvements in Apparatus for Drawing Off Liquids Containing Air or other Gases, (for which Letters Patent have been obtained in Germany, sub. No. 95,373, dated April 1, 1897;) and I do hereby declare the following to be a full, clear, and exact description of the invention, such as will enable others skilled in the art to which it appertains to make and use the same.

This invention refers to an apparatus for drawing off beer and other liquids containing air, carbonic-acid or other gases under pressure, in which the cock having two channels or passages—one for the liquid and the other for the entrance or exit of air—is automatically opened by pressing the same against the cask to be filled and which in the same manner is automatically closed as soon as the pressure is released. In this manner the drawing off is materially facilitated, since only a single grasp is necessary to press the cock air-tight against the cask to be filled and to open or close the cock. An apparatus of this description is shown in the accompanying drawings, in which—

Figure 2:
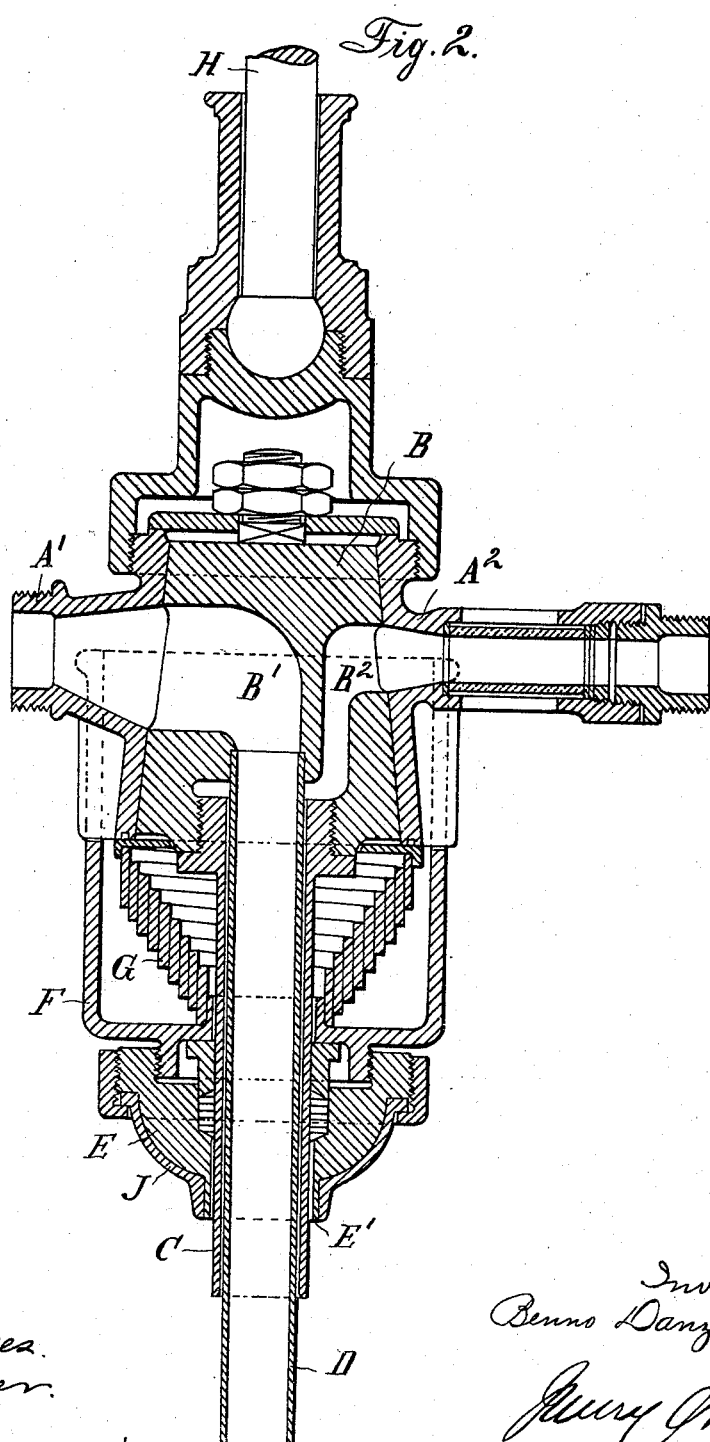
Figure 3:
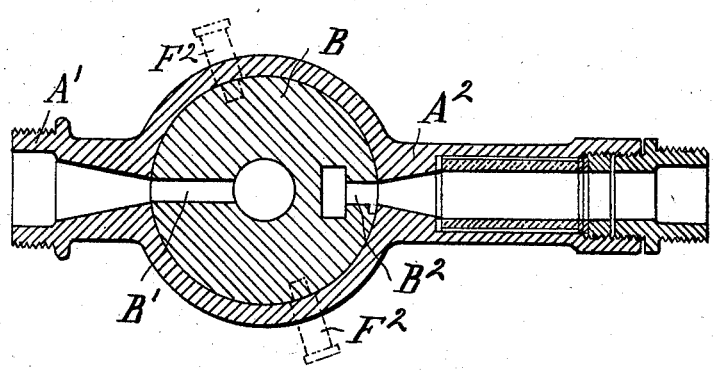
Figure 4:
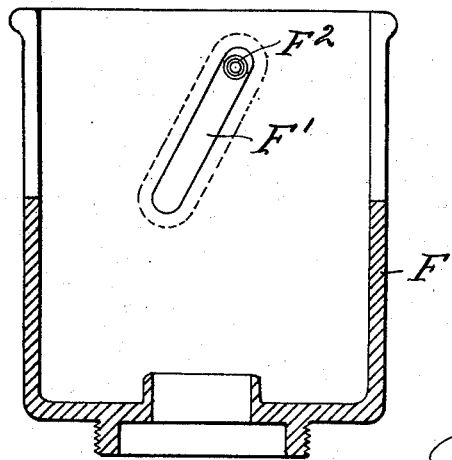

Figure 1 shows the cock in a vertical section closed, and Fig. 2 shows the same opened. Fig. 3 is a cross-section, and Fig. 4 shows a detail. In Fig. 5 and also in Fig. 6 is shown a modification.

The casing or box A is provided with the two side branches or pipes $A'$ $A^2$. The cock-plug B is arranged rotatably in the same and is provided with two channels or openings $B'$ $B^2$, of which the first is for the passage of the liquid and the latter for the entrance of the air into the cask to be filled or receptacle to be filled or for the exit of the same. These openings are arranged in such manner that in turning the cock into the open position first the opening $B^2$ is freed, so that the compressed air may enter into the empty cask before the opening for the beer is opened. Thus pressure will be maintained in the cask when the beer is led into the same. This pressure being the same as in the pipe leading the beer, no carbonic acid can escape.

Two concentric pipes C D are combined with the cock-plug and reach down, of which the first is in connection with the opening $B^2$ and the latter in connection with the opening $B'$. The outer pipe C is embraced by a head E, which is connected with a tube F by external and internal threads. The tube F has two oblique slots $F'$, into which two pins or studs $F^2$, mounted on the plug B, engage. The head E, together with the tube F, is pushed downward by means of a spiral spring G, arranged inside of the tube F. In the lowest position of the tube the studs $F^2$ bear against the upper end of the slots, as clearly shown in Fig. 4. The handling of the apparatus is thus: That the head E, furnished on the outside with a yielding or elastic material J, is led into the bung-hole of the cask to be filled, closing the hole completely. The cock is then pressed down by means of a cam (not shown in the drawings) or by any other means whereby the tube F relatively to the cock slides, and by means of the slots $F'$ the plug B is so turned that the opening $B'$ is opposite the opening of the branch or pipe $A'$ and the opening $B^2$ is opposite the branch or pipe $A^2$. Through the opening $B^2$ compressed air enters the cask from any reservoir, so that the frothing of the beer by the escape of carbonic acid is prevented. In the same degree as the cask is filled by the entering beer through the opening $B'$ compressed air escapes through the opening $B^2$ and the pipe $A^2$. When the cask is full, the rod H, which was held by suitable means after the cock was pressed down, is now released, so that the cock is again raised by means of the spring G, the cock-plug turning round, so that the openings $B'$ $B^2$ are closed.

In order to secure a good fit of the cock against the cask, so that it is pressed against the same perfectly air-tight, the head E is provided with a tubular prolongation $E'$, surrounded by the elastic jacket J. A shifting of the jacket when the cock is pressed against the cask is thus prevented and also an escape of the compressed air is impossible.

The modification shown in Fig. 5 is intended for drawing off beer into bottles. This modification differs from the apparatus described above only therein that the box is fixed and that the bottle to be filled is pressed against the head $E^3$, so that the latter slides relatively to the box by means of the cam $F^3$. Thus the cock-plug is rotated in the same manner as described above.

Another modification is shown in Fig. 6. Instead of a cock-plug a circular slide-valve $b$ is employed which can slide longitudinally in the box $a$. At its lower end the slide ends into a tube $C^6$, onto which the head $E^6$, carrying the tube $F^6$, is attached. The tube $C^6$ surrounds the tube $D^6$, which leads into the upper chamber, provided with the openings $b'$. At the lower end of the slide there is a conical flange M, forming a valve-seat which in the closed position of the slide shuts off the chamber $a^2$ of the box. Below this seat there are openings $b^2$ provided in the pipes $C^6$, which openings $b^2$ in the raised position of the piston form a communication between the chamber $a^2$ and the space between the pipes C D. When the apparatus is pressed against the cask, so that the head E enters the bung-hole and is pressed downward, the piston is pushed back against the tension of the spring $G^6$, so that the openings $b'$ of the upper chamber coincide with the openings $a'$ of the box, and the beer can flow into the barrel or cask by means of the central pipe $D^6$. The compressed air enters through the chamber $a^2$, provided with the branch pipe, (not shown in the drawings,) and through the openings $b^2$ into the space between the pipes $C^6$ $D^6$ and from here into the barrel and escapes in the same way, according to the entrance of the beer into the barrel.

Having thus described my invention, what I claim, and desire to secure by Letters Patent, is—

1. A cock for drawing off liquids containing air or other gases comprising a plug-box provided with ports for liquid and gas respectively, and a plug provided with like ports, said box movable on and along the plug, and means whereby the ports in said plug are brought into communication with the corresponding ports in the box when the latter is moved along said plug.

2. A cock for drawing off liquids containing air or other gases, comprising a spring-controlled plug-box provided with ports for liquid and gas respectively, and a plug provided with like ports, said box movable on and along the plug, and means whereby the ports in said plug are brought into communication with the corresponding ports in the box when the latter is moved along said plug against the stress of its spring.

3. A cock for drawing off liquid containing air or other gas, comprising a plug-box provided with ports for liquid and gas respectively, and a plug provided with like ports, said box movable on and along the plug and means whereby the ports for gas and liquid in said plug are successively brought into communication with the corresponding ports in the box.

4. A cock for drawing off liquid containing air or other gases, comprising a cam engaged by studs on the plug and adapted to turn the latter when the cock is pressed against the receptacle to be filled with the liquid substantially as described.

5. A cock for drawing off liquid containing air or other gases, comprising a tube having oblique slots engaged by studs on the plug and adapted to turn the latter when the cock is pressed against the receptacle to be filled with the liquid substantially as described.

6. A cock for drawing off liquid containing air or other gases comprising a tube having oblique slots engaged by studs on the valve-plug the casing of the cock being arranged to slide within the tube against the tension of a spring substantially as described.

7. In a cock for drawing off liquid containing air or other gases the combination of a movable cock-box and a plug having two channels with a tube provided with oblique slots and studs on the plug adapted to enter the slots to give the plug a partial rotation on the cock-box being pressed down against the tension of a spring, substantially as described.

8. In a cock for drawing off liquid containing air or other gases the combination of a movable cock-box, with a plug having studs and a cam engaged by said plug, the plug being provided with two channels or openings, communicating each with one of two concentric pipes connected to the plug and leading into the receptacle, substantially as described.

9. In a cock for drawing off liquid containing air or other gases the combination of a movable cock-box with a plug having studs, and a cam engaged by said plug, the plug being provided with two channels or openings of which one coincides with the respective opening in the box or casing before the other coincides with the opening of the box belonging thereto, when the plug is turned by the longitudinal motion of the cock-box, substantially as described.

In testimony that I claim the foregoing as my invention I have signed my name in presence of two subscribing witnesses.

BENNO DANZIGER.

Witnesses:
 BERNHARD C. HESSE,
 JACOB ADRIAN.